United States Patent
Block et al.

(10) Patent No.: US 9,916,154 B2
(45) Date of Patent: Mar. 13, 2018

(54) FILE-BASED TRANSPORT OF TABLE CONTENT

(71) Applicants: Meinolf Block, Heidelberg (DE); Urlich Bestfleisch, Schwetzingen (DE); Daniel Hutzel, Karlsruhe (DE); Udo Klein, Leopoldshafen (DE)

(72) Inventors: Meinolf Block, Heidelberg (DE); Urlich Bestfleisch, Schwetzingen (DE); Daniel Hutzel, Karlsruhe (DE); Udo Klein, Leopoldshafen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/645,611

(22) Filed: Mar. 12, 2015

(65) Prior Publication Data
US 2016/0266895 A1 Sep. 15, 2016

(51) Int. Cl.
*G06F 9/44* (2006.01)
*G06F 17/30* (2006.01)

(52) U.S. Cl.
CPC ............ *G06F 8/70* (2013.01); *G06F 8/71* (2013.01); *G06F 17/30165* (2013.01)

(58) Field of Classification Search
CPC ...................................................... G06F 8/71
See application file for complete search history.

(56) References Cited

U.S. PATENT DOCUMENTS

| | | | |
|---|---|---|---|
| 6,324,578 B1 | 11/2001 | Cox et al. | |
| 6,728,877 B2 | 4/2004 | Mackin et al. | |
| 7,228,326 B2 | 6/2007 | Srinivasan et al. | |
| 7,590,669 B2 | 9/2009 | Yip et al. | |
| 7,609,651 B1 | 10/2009 | McBride et al. | |
| 8,584,087 B2 | 11/2013 | Rasch et al. | |
| 2002/0133484 A1* | 9/2002 | Chau ................. | G06F 17/30917 |
| 2007/0027906 A1* | 2/2007 | Meijer .............. | G06F 17/30607 |
| 2008/0028376 A1* | 1/2008 | Kostoulas ........... | G06F 17/2247 717/143 |
| 2009/0300063 A1* | 12/2009 | Neil ................... | G06F 17/30569 |
| 2012/0084319 A1* | 4/2012 | Bansode ........... | G06F 17/30289 707/769 |
| 2012/0265726 A1* | 10/2012 | Padmanabhan ....... | G06F 17/303 707/602 |
| 2013/0226970 A1* | 8/2013 | Weber ................. | G06F 21/6218 707/785 |
| 2015/0161235 A1* | 6/2015 | Libfeld ............... | G06F 17/3056 707/607 |

* cited by examiner

*Primary Examiner* — Hang Pan
(74) *Attorney, Agent, or Firm* — Buckley, Maschoff & Talwalkar LLC

(57) ABSTRACT

A system includes reception of a configuration set definition file defining the structure of one or more customizing tables of a software application, reception of a configuration data file including data for the one or more customizing tables, and, during activation of the software application in a run-time system, generation of the one or more customizing tables based on the configuration set definition file, generation of a service to access the configuration data file, and population of the one or more customizing tables with data of the configuration data file.

19 Claims, 8 Drawing Sheets

Configuration Data

| | |
|---|---|
| Name: * | param1 |
| Type: * | param2 |
| Host Name: * | param3 |
| Port: * | param4 |
| Username: * | param5 |
| Password: | param6 |
| Alias Name: | param7 |
| Owner Name: | param8 |
| Production Only: | ☐ |
| Allow View Data: | ☐ |
| Enabled: | ☑ |

[ Save ] [ Activate ] [ Cancel ]

*FIG. 7*

FILE-BASED TRANSPORT OF TABLE CONTENT

BACKGROUND

Development of a software application includes creation of design-time programming artifacts. Developers create these artifacts by writing code and storing the code into various "source" files. In order to generate an executable application, certain ones of the artifacts are flagged as active, validated, and compiled into corresponding runtime artifacts. The runtime artifacts are then deployed for execution.

Software development systems provide support for this file-based software development process. This support includes editing environments as well as systems which provide versioning and lifecycle management for the source files.

Operation of a software application may rely on tabular data, such as configuration data, which is preferably shipped along with corresponding versions of the software application. However, existing software development systems are incapable of efficiently managing tabular data. As a result, existing systems are not suitable for establishing a common lifecycle for code and tabular data of a software application.

BRIEF DESCRIPTION OF THE DRAWINGS

FIG. 7 is view of a customizing user interface according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

Generally, some embodiments address the foregoing by supporting the exposure of files of data as if they were database tables, and the building of application-specific data management applications on top of this data exposure. The files including the data may be integrated within the application lifecycle along with all the other files that make up the application.

Figure 1:
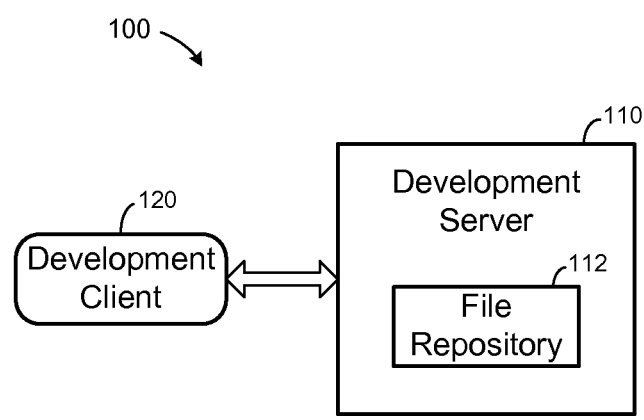
FIG. 1 is a block diagram of a server-based design-time system according to some embodiments.

FIG. 1 is a block diagram of system 100 according to some embodiments. System 100 includes development server 110 and development client 120.

Development client 120 may comprise a computing device executing one or more software applications for creating files including design-time artifacts. The one or more software applications may comprise a development environment, or suite. The design-time artifacts may comprise, but are not limited to, projects, packages, schemas, data models, procedures, etc. Design-time artifacts may be created in any programming language that is or becomes known. The files of the one or more software applications are stored in file repository 112 of development server 110.

Figure 2:
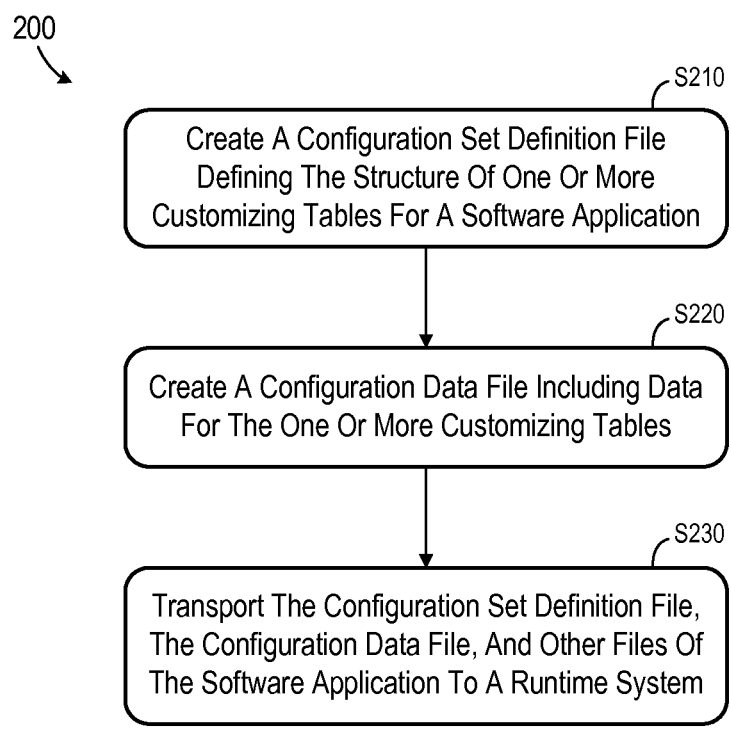
FIG. 2 is a flow diagram of a process according to some embodiments.

FIG. 2 comprises a flow diagram of process 200 according to some embodiments. In some embodiments, various hardware elements of system 100 (e.g., one or more processors) execute program code to perform process 200. Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a configuration set definition file is created. The configuration set definition file defines the structure of one or more customizing tables for a software application. Development client 120 may execute program code of any suitable development environment to create, alone or in conjunction with code executed by development server 110, a configuration set definition file according to some embodiments.

In some embodiments, the configuration set definition file conforms to a conventional data services infrastructure, extended as described herein. These extensions include metadata to define a configuration set, to mark tables with text-reference fields and specify the tables' text metadata, and to mark f-path fields.

To define a configuration set without language-translatable text at S210, the persistence model is straight-forward. Generally, the application freely defines the names and types of all key and non-key fields.

For example, using a shorthand notation:
CONF_XTABLE=[xk1|xk2|xk3] [xattr1|xattr2| xattr3]

Definition at S210 of a configuration set with translatable text presents additional considerations. In this regard, an intuitive design for text tables may be:
SIMPLE_CONF_WITH_TEXTSTABLE=[yk1|yk2|yk3| locale @locale] [text1|text2]

However, support for extensions to data files is desired, where the extension file overwrites some of the text of the original data file. The activation of such an "extension cluster" should result in filling the text table with some original text from the base file, and some original text from the extension file. The above design supports this function.

Language translations will also exist for both original text and extension texts. The translation process will bring in translations for all text from the base file, including those that are overwritten by the extension file. This requires the translation import function to detect that some translations should not be entered to the text table because the customer has replaced the original language text, and that extension translations have to replace existing base translations. This requirement may present difficulties with the above table design.

Therefore, for a configuration set with translatable text-attributes, it is proposed to split the table into two tables. The first table includes the desired semantic key for the text and two attribute fields: the file-path (the package and name of the data file that includes the text); and an artificial reference value (e.g. a hash of the semantic key). The second table stores the text, and includes: a key consisting of file-path and reference, and a language field; and, as attribute fields, one field for every required text.

The following is an example of the two tables according to some embodiments:
$CONF\_Y\_REFS_{TABLE}$=[yk1|yk2|yk3] [f-path| text-ref]
$CONF\_Y\_TEXTS_{TABLE}$=[f-path| text-ref| locale] [text1| text2]

Usage of the f-path field provides a conflict-free storage of texts (original-language and translations) coming from different data files.

For simplified read access, a view may be generated that joins CONF_Y_REFS and CONF_Y_TEXT and exhibits the logically-desired single-table structure:
$CONF\_Y_{VIEW}$=[yk1|yk2|yk3| locale @locale] [text1|text2]

The view should implicitly follow the appropriate language fallback.

For simplified data maintenance (e.g., during the activation of data files), a maintenance view may be generated:
$CONF\_Y\_MAINT_{VIEW}$=[yk1|yk2|yk3|f-path|text-ref] [text1|text2]

As mentioned above, the configuration set definition file is associated with generation logic. Execution and function of this generation logic will be described below. The configuration set definition may also specify an application-specific database procedure which is called during the activation of corresponding configuration data files (described below) to verify that the content of configuration tables which are populated by data of the configuration data files is semantically meaningful and correct after the activation.

Returning to process 200, a configuration data file is created at S220. The configuration data file includes data for the one or more customizing tables defined by the configuration set definition file. The configuration data file may conform to JSON in some embodiments.

Figure 3:
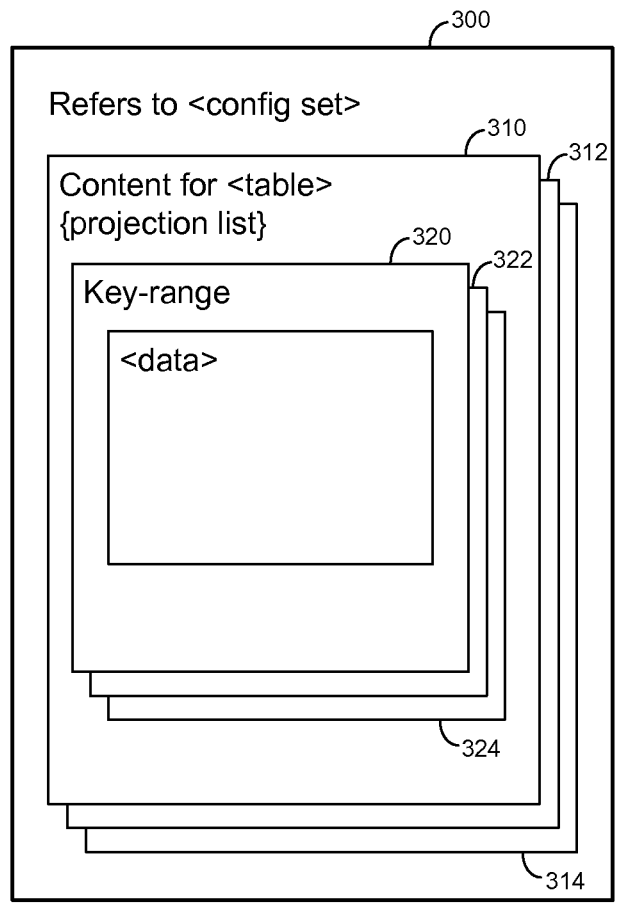
FIG. 3 illustrates a configuration data file according to some embodiments.

The configuration data file may include a reference to a single configuration set, and multiple content blocks. A content block consists of a reference to a table or maintenance view in the configuration set, and a header line defining the fields for which data are brought (i.e., a projection list), and multiple key range blocks, for which the data are defined. Each key range block contains the data itself, which is located within its corresponding key-range and includes the fields defined in the projection list. FIG. 3 is a representation of configuration data file 300, which includes content blocks 310-314 and key range blocks 320-324.

According to some embodiments, data corresponding to the previous configuration data set example may be defined as:
CONF_X=[xk1|xk2|xk3] [xattr1|xattr2|xattr3]
CONF_Y=[yk1|yk2|yk3][text1|text2]// no locale, original text is stored with empty locale Some embodiments may support extension data files, which may also be created at S220. An extension file to a configuration data file allows overwriting of complete key ranges or of selected text, using the same syntax as above.

The configuration set definition file and the configuration data file are transported to a runtime system at S230. Also transported at S230 may be source code files and additional configuration set definition files and corresponding configuration data files. Transport of the files may occur according to any currently or hereafter-known system.

Figure 4:
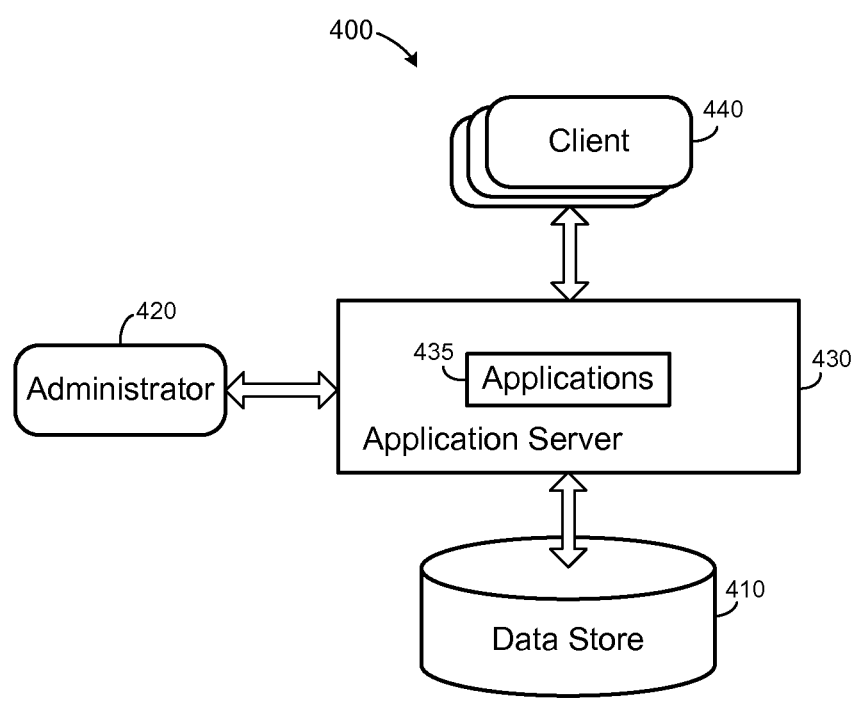
FIG. 4 is a block diagram of a runtime system according to some embodiments.

FIG. 4 is a block diagram of runtime system 400 according to some embodiments. System 400 includes data store 410, administrator 420, application server 430 and clients 440. Generally, application server 430 receives queries from clients 440 and provides results to clients 440 based on data of data store 410. Administrator 420 is operated to manage the data and operation of application server 430, data store 410 and/or applications 435.

Application server 430 executes and provides services to applications 435. Applications 435 comprise server-side executable program code (e.g., compiled code, scripts, etc.) which provide functionality to clients 440 by providing user interfaces to clients 440, receiving requests from clients 440, retrieving data from data store 410 based on the requests, processing the data received from data store 410, and providing the processed data to clients 440. One or more of applications 435 may have been created by development system 100, with design-time artifacts such as source code files, configuration set definition files, configuration data files, and generation logic of the application 435 being stored in data store 410. Applications 435 may be made available for execution by application server 430 via registration and/or other procedures which are known in the art.

Application server 430 provides any suitable interfaces through which clients 440 may communicate with applications 435 executing on application server 430. For example, application server 430 may include a HyperText Transfer Protocol (HTTP) interface supporting a transient request/response protocol over Transmission Control Protocol (TCP), and/or a WebSocket interface supporting non-transient full-duplex communications between application server 430 and any clients 440 which implement the WebSocket protocol over a single TCP connection.

One or more applications 435 executing on server 430 may communicate with data store 410 using database management interfaces such as, but not limited to, Open Database Connectivity (ODBC) and Java Database Connectivity (JDBC) interfaces. These types of applications 235 may use Structured Query Language (SQL) to manage and query data stored in data store 410.

Application server 430 may be separated from or closely integrated with data store 410. A closely-integrated application server 430 may enable execution of server applications 435 completely on the database platform, without the need for an additional application server. For example, according to some embodiments, application server 430 provides a comprehensive set of embedded services which provide end-to-end support for Web-based applications. The services may include a lightweight web server, configurable support for Open Data Protocol, server-side JavaScript execution and access to SQL and SQLScript.

Application server 430 may provide application services (e.g., via functional libraries) using which applications 435 may manage and query the data of data store 410. The application services can be used to expose the database data model, with its tables, views and database procedures, to clients. In addition to exposing the data model, application server 430 may host system services such as a search service.

Data store 410 may also provide application logic, such as database procedures and/or calculations, according to some embodiments. This application logic may be created by development system 100, and may comprise scripts, functional libraries and/or compiled program code.

Data store 410 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data store 410 may comprise any query-responsive data source or sources that are or become known, including but not limited to a structured-query language (SQL) relational database management system. Data store 410 may comprise a relational database, a multi-dimensional database, an eXtendable Markup Language (XML) document, or any other data storage system storing structured and/or unstructured data. The data of data store 410 may be distributed among several relational databases, dimensional databases, and/or other data sources. Embodiments are not limited to any number or types of data sources.

In some embodiments, the data of data store 410 may comprise one or more of conventional tabular data, row-based data, column-based data, and object-based data. Moreover, the data may be indexed and/or selectively replicated in an index to allow fast searching and retrieval thereof. Data store 410 may support multi-tenancy to separately support multiple unrelated clients by providing multiple logical database systems which are programmatically isolated from one another.

Each of clients 440 may comprise one or more devices executing program code of a software application for presenting user interfaces to allow interaction with application server 430. The user interfaces may comprise user interfaces suited for reporting, data analysis, and/or any other functions based on the data of data store 410.

Presentation of a user interface as described herein may comprise any degree or type of rendering, depending on the type of user interface code generated by application server 430. For example, a client 440 may execute a Web Browser to request and receive a Web page (e.g., in HTML format) from application server 430 via HTTP, HTTPS, and/or WebSocket, and may render and present the Web page according to known protocols. One or more of clients 440 may also or alternatively present user interfaces by executing a standalone executable file (e.g., an .exe file) or code (e.g., a JAVA applet) within a virtual machine.

Figure 5:
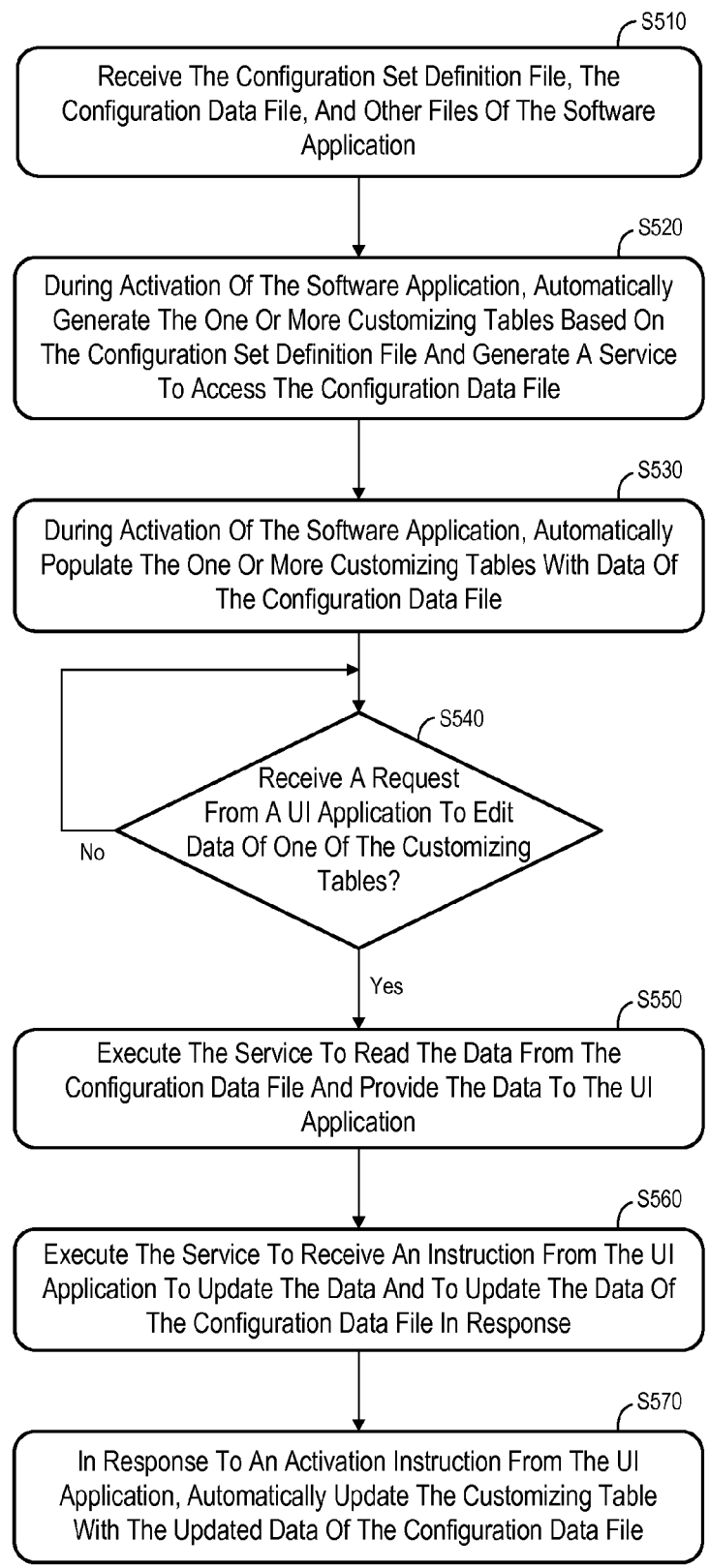
FIG. 5 is a flow diagram of a process according to some embodiments.

FIG. 5 comprises a flow diagram of process 500 according to some embodiments. In some embodiments, various hardware elements of application server 430 (e.g., one or more processors) execute program code to perform process 500.

Initially, at S510, files of a software application are received. The files include at least one configuration set definition file, one or more configuration data files associated with each configuration set definition file, and other source files of the software application. The configuration set definition files and the configuration data files may have been created and may be constituted as described above with respect to process 200. The files may be received at S510 via a network, transportable computer-readable media, or any other mode of transmission.

Next, a command is received to activate the software application. The command may be issued by an administrator operating a user interface displayed by administrator 420.

During activation of the software application, and at S520, one or more customizing tables are automatically generated based on the configuration set definition file. In addition, a service to access the configuration data file is generated.

According to some embodiments, generation logic associated with a configuration set definition is executed upon activation of a configuration file containing the definition. The generation logic may generate, in the database (CONF_X), all non-translatable customizing tables that are defined in the configuration set definition file, and may define translatable customizing tables in the structure of the access view (CONF_Y). With respect to the previous example, activation generates the two tables CONF_Y_REFS and CONF_Y_TEXTS, as well as the access view CONF_Y.

The service generated at S520 is different from typical OData services in that the service is not required to expose the data of real configuration tables. Rather, the generated service supports management of configuration data files. According to some embodiments, the service facilitates the authoring of customizing UIs for database applications.

According to some embodiments, the configuration service for a given configuration-set $CS_0$ supports the following operations:

1) For a chosen configuration data file, display the complete extension cluster, i.e. all files in the repository that refer directly or indirectly to $CS_0$.

2) Create new configuration data files or extension files to existing configuration data-files for $CS_0$.

3) Display the content (i.e., data) of a configuration data file, which includes the content blocks and the data of the configuration data file. Each content block, as described above, includes the content block header with the reference to a table or maintenance view in the configuration set, the key range, for which the data are defined, and the header line defining the fields for which data are brought.

The configuration service may also allow editing (i.e., creating, deleting and updating) the content of the configuration data file.

The configuration service may expose an Entity Data Model containing fixed entities and entities specific to the associated configuration data set. The entities according to some embodiments include ConfigDataFile ([fileURL, basefileURL]), ContentBlock ([fileURL, blockIdx, tableRef]), ContentBlockKeyRange ([fileURL, blockIdx, keyRange]), and ContentBlockData<TableName>([fileURL, blockIdx, keyRange, <table fields>]).

ConfigDataFile may be a fixed entity which exposes the configuration data files that refer to the configuration set. The configuration data files, in turn, expose their reference to the configuration set as a cross-reference. The configuration service may use the repository's query methods to find active and inactive cross-references pointing to the given configuration set. The parameter basefileURL is null for base files.

ContentBlock exposes the content blocks of each respective configuration data file, with the parameter blockIdx being created on-the-fly. ContentBlockData exposes the configuration data, and the keys must match the key-range of the content block. Moreover, the referenced content block must refer to the correct table/view.

Returning to process 500, activation of the software application also includes, at S530, automatic population of the one or more customizing tables (defined by the configuration set definition file and generated at S520) with data of the configuration data file.

According to some embodiments, S530 may include verification that the "extension cluster" (i.e., the configuration data file and any extension files) is a well-formed tree, that the structure of the specified data sections fits to the underlying tables, and that the specified key ranges do not overlap with the key ranges of other extension clusters.

If the verification is successful, then, for each key range specified in the extension cluster, the key range is blocked by selecting the key range for update, a temp table is created with the structure of the real table/maintenance view, and the extension cluster is evaluated file by file, traversing its tree from the root to the leaves. Evaluation of the extension cluster may include updating/inserting all entries from the data sections of the files into the respective temp table, specifying in the update/insert only those fields that are mentioned in the header line of the content block. For text tables, the additional information f-path and text-ref is provided.

Next, all lines in the current key range in the real table/maintenance view that are not found again in the temp table are deleted. All entries in the real table/maintenance view are updated/inserted from the temp table, specifying only those fields that are mentioned in the header line of the content block.

The definition of the configuration may include an application-specific database procedure to verify that the content of the configuration tables is semantically meaningful and correct after the activation. The procedure may have a simple signature, without an input, and with an output such as the repository CheckResults, with the limitation that only info and warning messages, and no errors, are allowed. This procedure may be called after the above steps of S530.

In many cases it may be difficult or impossible to assign inconsistencies in the configuration data set uniquely to one of the existing configuration data files. Also, even if changes to one file introduced an inconsistency, it might be necessary to adapt one or more other files to achieve the desired result. The checks may thus be called for the complete configuration set.

Figure 6:
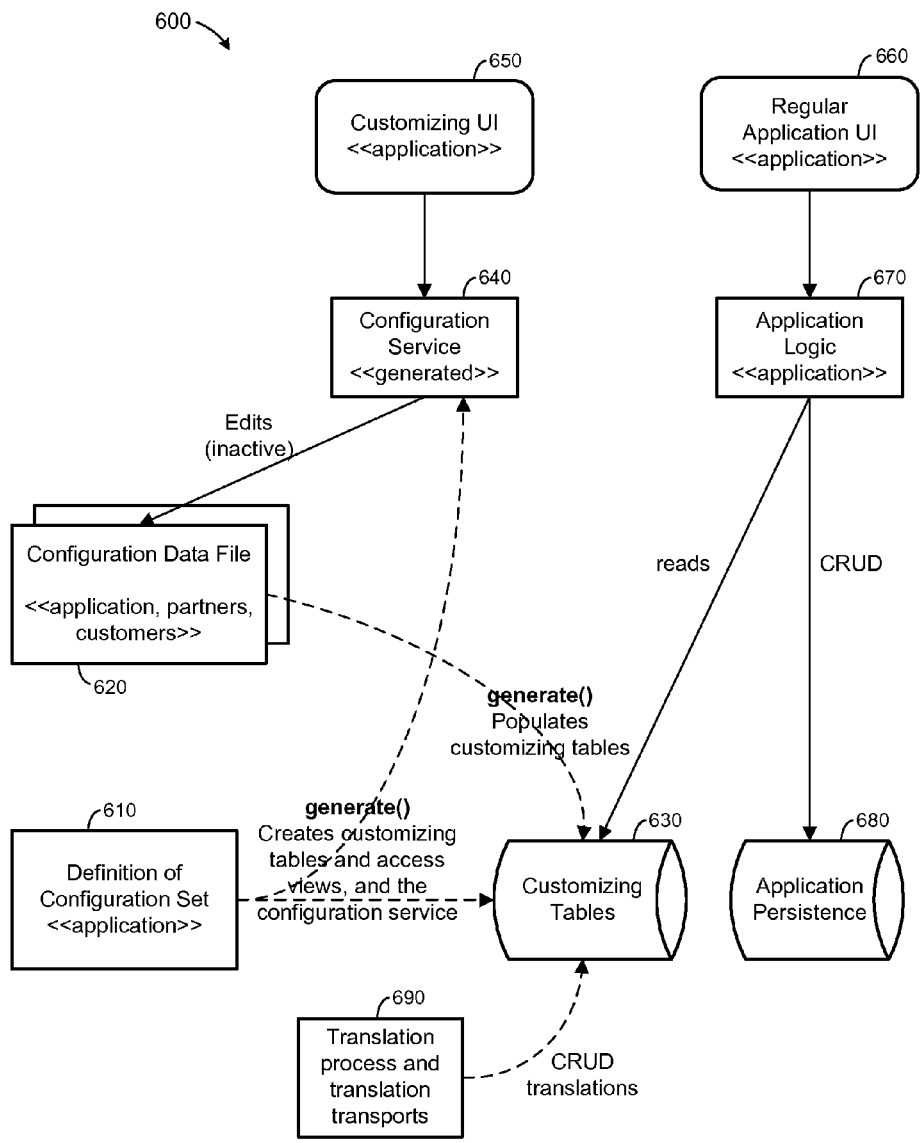
FIG. 6 is a functional block diagram according to some embodiments.

FIG. 6 illustrates process 500 according to some embodiments. As shown, customizing tables 630 are generated based on configuration set definition file 610. Customizing tables 630 are then populated with data from configuration data files 620. In addition, configuration service 640 is generated based on configuration set definition file 610.

Configuration service 640 may be used by customizing UI 650 to access data of configuration data files 620. Advantageously, and according to some embodiments, configuration service 640 exposes the data as tabular content, thereby facilitating authoring of customizing UI 650 and management of the data by an administrator or developer operating customizing UI 650.

In this regard, process 500 pauses at S540 until a request is received from a UI application to edit data of one of the customizing tables. Once a request is received, the service (e.g., configuration service 640) is executed at S550 to read the data from the configuration data file and provide the data to the UI application. According to some embodiments, the received request causes the service to deserialize the existence and content of the configuration data file(s) of the configuration set to temp tables, which exhibit the structure of the Entity Data Model entities defined by the service. The UI application has read/write access to these temp tables.

FIG. 7 is an outward view of user interface 700 of a UI application according to some embodiments. The fields of user interface 700 as shown are populated with generic parameter values. The fields may initially include data read from the configuration data file, and the data may be changed by an operator. After updating the fields as desired, the operator may select the Save button and, as a result, an instruction is received at S560 to update the data of the configuration data file. Updating the configuration data file may consist of serializing updated content of the temp table to the configuration data file.

The Activate button of FIG. 7 may be selected to issue an activation instruction to the service. In response, the customizing table is automatically updated at S570 with the updated data of the configuration data file. Updating of the customizing table at S570 may proceed as described above with respect to S530.

As illustrated in FIG. 6, a translation process may be applied to the customizing tables. According to some embodiments, all text tables have the same structure, thereby facilitating implementation of the translation process.

Translatable texts are maintained with "empty" locale, which represents the original locale. The identity of the original language may be maintained for each text table (i.e., within the configuration set definition file), or for certain key areas (i.e., within the configuration data files).

Figure 8:
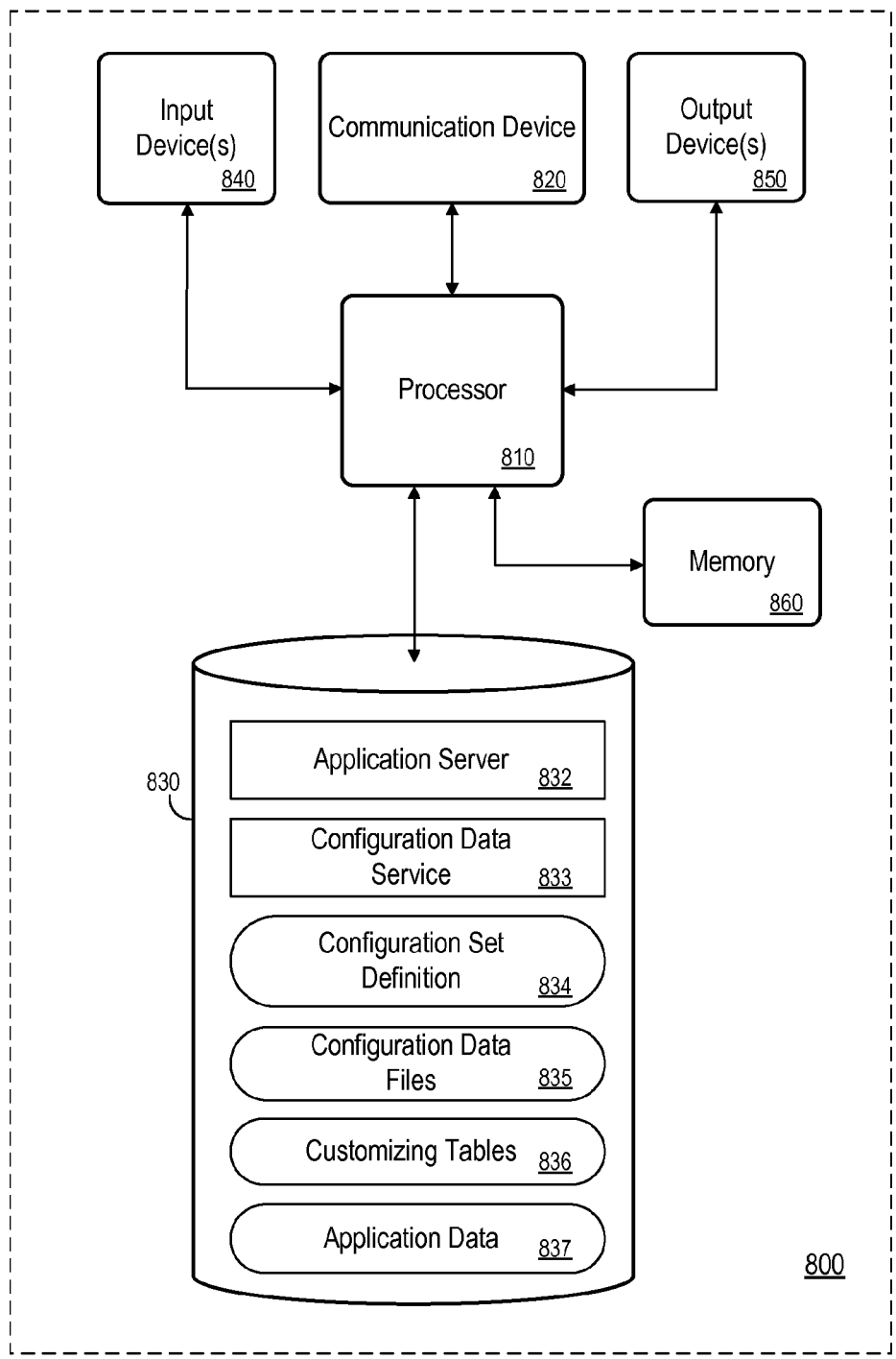
FIG. 8 is a block diagram of an apparatus according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of application server 430 and data store 410 of FIG. 4 in some embodiments. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Application server 832 may comprise program code executed by processor 810 to cause apparatus 800 to perform any one or more of the processes described herein. Embodiments are not limited to execution of these processes by a single apparatus.

Device 830 also includes executable code of configuration data service 833, and configuration set definitions 834 and configuration data files 835 as described above. Also included are customizing tables 836 and application data 837. Application data 837 (either cached or a full database) may be stored in volatile memory such as memory 860. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps; and
   a processor to execute the processor-executable process steps to cause the system to:
   receive a configuration set definition file that (i) defines the structure of one or more customizing tables of a software application, the customizing tables configured to expose data files as database tables and (ii) specifies an application-specific database procedure associated with verifying data semantics, the application-specific database procedure built on top of the exposed data files;
   receive a configuration data file including data for the one or more customizing tables; and
   during activation of the software application in a run-time system: generate the one or more customizing tables based on the configuration set definition file, generate a configuration service to (i) expose a model comprising a first fixed entity that exposes the configuration data file and a second fixed entity that exposes one or more content blocks associated with the configuration data file, (ii) access, create, delete and update the content of the configuration data file, and (iii) populate the one or more customizing tables with data of the configuration data file wherein the application-specific database procedure is called during the activation of the software application to verify that the data in the populated customizing tables is semantically correct;
   identifying a second set of non-translatable customizing tables of the configuration set definition file; and
   for each of the second set of non-translatable customizing tables, generating a first table storing a semantic key for table text of each of the second set of non-translatable customizing tables and generation of a second table storing the table text.

2. A system according to claim 1, wherein the processor is further to execute the processor-executable process steps to cause the system to:
   receive a request to read data from the configuration data file from a user interface application;
   in response to the request, execute the service to deserialize the data into a temporary table; and
   transmit the data of the temporary table to the user interface application.

3. A system according to claim 2, wherein the processor is further to execute the processor-executable process steps to cause the system to:
   receive a second request to update the transmitted data;
   in response to the second request, execute the service to serialize the updated data into the configuration data file.

4. A system according to claim 3, wherein the processor is further to execute the processor-executable process steps to cause the system to:
   populate the one or more customizing tables with the updated data of the configuration data file.

5. A system according to claim 1, wherein generation of the one or more customizing tables based on the configuration set definition file comprises:
   identification of a first set of non-translatable customizing tables of the configuration set definition file; and
   generation of the first set of non-translatable customizing tables.

6. A system according to claim 1, wherein generation of the one or more customizing tables based on the configuration set definition file further comprises:
   for each of the second set of non-translatable customizing tables, generation of a view joining the first table and the second table.

7. The method of claim 1, wherein the exposed model further comprises a third fixed entity that exposes configuration data associated with keys to match a key-range of the one or more content blocks of the configuration data file.

8. A computer-implemented method comprising:
   receiving a configuration set definition file that (i) defines the structure of one or more customizing tables of a software application, the customizing tables configured to expose data files as database tables and (ii) specifies an application-specific database procedure associated with verifying data semantics, the application-specific database procedure built on top of the exposed data files;
   receiving a configuration data file including data for the one or more customizing tables;
   during activation of the software application in a run-time system:
   automatically generating the one or more customizing tables based on the configuration set definition file, generating a service to (i) expose a model comprising a first fixed entity that exposes the configuration data file and a second fixed entity that exposes one or more content blocks associated with the configuration data file, (ii) access, create, delete and update the content of the configuration data file, and (iii) populating the one or more customizing tables with data of the configuration data file wherein the application-specific database procedure is called during the activation of the software application to verify that the data in the populated customizing tables is semantically correct;
   identification of a second set of non-translatable customizing tables of the configuration set definition file; and
   for each of the second set of non-translatable customizing tables, generation of a first table storing a semantic key for table text of each of the second set of non-translatable customizing tables and generation of a second table storing the table text.

9. A method according to claim 8, further comprising:
   receiving a request to read data from the configuration data file from a user interface application;
   in response to the request, executing the service to deserialize the data into a temporary table; and transmitting the data of the temporary table to the user interface application.

10. A method according to claim 9, further comprising:
receiving a second request to update the transmitted data;
in response to the second request, executing the service to serialize the updated data into the configuration data file.

11. A method according to claim 10, further comprising:
populating the one or more customizing tables with the updated data of the configuration data file.

12. A method according to claim 8, wherein generating the one or more customizing tables based on the configuration set definition file comprises:
identifying a first set of non-translatable customizing tables of the configuration set definition file; and
generating of the first set of non-translatable customizing tables.

13. A method according to claim 8, wherein generating the one or more customizing tables based on the configuration set definition file further comprises:
for each of the second set of non-translatable customizing tables, generating a view joining the first table and the second table.

14. A non-transitory computer-readable medium storing program code, the program code executable by a computer system to cause the computer system to:
receive a configuration set definition file that (i) defines the structure of one or more customizing tables of a software application, the customizing tables configured to expose data files as database tables and (ii) specifies an application-specific database procedure associated with verifying data semantics, the application-specific database procedure built on top of the exposed data files;
receive a configuration data file including data for the one or more customizing tables;
during activation of the software application in a runtime system:
generate the one or more customizing tables based on the configuration set definition file, generate a service to (i) expose a model comprising a first fixed entity that exposes the configuration data file and a second fixed entity that exposes one or more content blocks associated with the configuration data file, (ii) access, create, delete and update the content of the configuration data file, and (iii) populate the one or more customizing tables with data of the configuration data file wherein the application-specific database procedure is called during the activation of the software application to verify that the data in the populated customizing tables is semantically correct;
identification of a second set of non-translatable customizing tables of the configuration set definition file; and
for each of the second set of non-translatable customizing tables, generation of a first table storing a semantic key for table text of each of the second set of non-translatable customizing tables and generation of a second table storing the table text.

15. A medium according to claim 14, wherein the program code is further executable by a computer system to cause the computer system to:
receive a request to read data from the configuration data file from a user interface application;
in response to the request, execute the service to deserialize the data into a temporary table; and
transmit the data of the temporary table to the user interface application.

16. A medium according to claim 15, wherein the program code is further executable by a computer system to cause the computer system to:
receive a second request to update the transmitted data;
in response to the second request, execute the service to serialize the updated data into the configuration data file.

17. A medium according to claim 16, wherein the program code is further executable by a computer system to cause the computer system to:
populate the one or more customizing tables with the updated data of the configuration data file.

18. A medium according to claim 14, wherein generation of the one or more customizing tables based on the configuration set definition file comprises:
identification of a first set of non-translatable customizing tables of the configuration set definition file; and
generation of the first set of non-translatable customizing tables.

19. A medium according to claim 14, wherein generation of the one or more customizing tables based on the configuration set definition file further comprises:
for each of the second set of non-translatable customizing tables, generation of a view joining the first table and the second table.

* * * * *